US012812495B2

(12) United States Patent
Klatt

(10) Patent No.: US 12,812,495 B2
(45) Date of Patent: Nov. 24, 2026

(54) METHOD FOR ENHANCING CONTINUITY OF DATA TRANSMISSIONS AND/OR FOR REDUCING INTERRUPTION OR INTERRUPTION PERIODS OF DATA TRANSMISSIONS BETWEEN A USER EQUIPMENT AND A MOBILE COMMUNICATION NETWORK

(71) Applicant: Deutsche Telekom AG, Bonn (DE)

(72) Inventor: Axel Klatt, Cologne (DE)

(73) Assignee: DEUTSCHE TELEKOM AG, Bonn (DE)

( * ) Notice: Subject to any disclaimer, the term of this patent is extended or adjusted under 35 U.S.C. 154(b) by 544 days.

(21) Appl. No.: 17/791,554

(22) PCT Filed: Jan. 5, 2021

(86) PCT No.: PCT/EP2021/050093
§ 371 (c)(1),
(2) Date: Jul. 8, 2022

(87) PCT Pub. No.: WO2021/151628
PCT Pub. Date: Aug. 5, 2021

(65) Prior Publication Data
US 2023/0030898 A1 Feb. 2, 2023

(30) Foreign Application Priority Data
Jan. 29, 2020 (EP) .................................... 20154354

(51) Int. Cl.
*H04W 36/30* (2009.01)
*H04W 36/00* (2009.01)

(52) U.S. Cl.
CPC ..... *H04W 36/305* (2018.08); *H04W 36/0085* (2018.08)

(58) Field of Classification Search
CPC . H04W 36/0085; H04W 36/305; Y02D 30/70
See application file for complete search history.

(56) References Cited

U.S. PATENT DOCUMENTS 9,565,610 B2 2/2017 Ibrahim et al.
9,661,509 B2 5/2017 Anepu et al.
(Continued)

FOREIGN PATENT DOCUMENTS

WO WO 2016114215 A1 7/2016

OTHER PUBLICATIONS

ERICSSON: "Mobility enhancements NB-IoT", 3GPP Draft; R2-165159 Mobility Enhancements NB-IOT, 3rd Generation Partnership Project (3GPP), Mobile Competence Centre; 650, Route Des Lucioles; F-06921 Sophia-Antipolis Cedex; France, vol. RAN WG2, No. Gothenburg, Sweden; Aug. 22, 2016-Aug. 26, 2016 Aug. 21, 2016 (Aug. 21, 2016), XP051126773, Retrieved from the Internet: URL:http://www.3gpp.org/ftp/Meetings_3GPP SYNC/RAN2/Docs/ [retrieved on Aug. 21, 2016].
(Continued)

*Primary Examiner* — Jeanette J Parker
*Assistant Examiner* — Dung L Lam
(74) *Attorney, Agent, or Firm* — LEYDIG, VOIT & MAYER, LTD.

(57) ABSTRACT

A method for enhancing continuity of data transmissions and/or for reducing interruption or interruption periods of data transmissions between a user equipment and a mobile communication network includes: receiving, by the user equipment, a radio link threshold indication, the radio link threshold indication being related to at least one radio link quality parameter and indicating a threshold value regarding the at least one radio link quality parameter; measuring or detecting, by the user equipment while being in connected mode and being served by the first base station entity, a
(Continued)

100 mobile communication network 110 access network
120 core network 11 first radio cell
12 second radio cell 111 first base station entity
112 second base station entity 20 user equipment deterioration of a radio communication link to and/or from the first base station entity; and based on comparing the measured or detected deterioration to the threshold value of the radio link threshold indication, initiating, by the user equipment, a preparation stage for a radio link failure procedure.

13 Claims, 2 Drawing Sheets

(56) References Cited

U.S. PATENT DOCUMENTS

| | | | | |
|---|---|---|---|---|
| 2008/0220784 | A1* | 9/2008 | Somasundaram | H04W 36/00837 455/67.11 |
| 2010/0317362 | A1* | 12/2010 | Lee | H04W 16/28 455/439 |
| 2013/0183974 | A1* | 7/2013 | Johansson | H04W 36/249 455/436 |
| 2015/0245405 | A1* | 8/2015 | Johansson | H04W 36/0061 370/216 |
| 2017/0318527 | A1* | 11/2017 | Chuang | H04W 72/51 |
| 2018/0132300 | A1* | 5/2018 | Viering | H04W 76/19 |
| 2018/0302934 | A1* | 10/2018 | Chisu | H04W 76/18 |

OTHER PUBLICATIONS

LG Electronics Inc., 2Connected Mobility Enhancement in NB-IOT, TSG-RAN WG2#97Bis R2-1703686, 3GPP, Mar. 25, 2017, pp. 1-5, Spokane, USA.

ERICSSON: “Mobility enhancements NB-IoT”, 3GPP TSG-RAN 2#95R2-165159, Aug. 13, 2016; pp. 1-9, Gothenburg, Sweden.

* cited by examiner 100 mobile communication network 110 access network
120 core network 11 first radio cell
12 second radio cell 111 first base station entity
112 second base station entity 20 user equipment 111 first base station entity 20 user equipment 201 radio link threshold indication
202 radio cell list indication

METHOD FOR ENHANCING CONTINUITY OF DATA TRANSMISSIONS AND/OR FOR REDUCING INTERRUPTION OR INTERRUPTION PERIODS OF DATA TRANSMISSIONS BETWEEN A USER EQUIPMENT AND A MOBILE COMMUNICATION NETWORK

CROSS-REFERENCE TO PRIOR APPLICATIONS

This application is a U.S. National Phase application under 35 U.S.C. § 371 of International Application No. PCT/EP2021/050093, filed on Jan. 5, 2021, and claims benefit to European Patent Application No. EP 20154354.3, filed on Jan. 29, 2020. The International Application was published in English on Aug. 5, 2021 as WO 2021/151628 A1 under PCT Article 21(2).

FIELD

The present invention relates to a method for enhancing continuity of data transmissions and/or for reducing interruption or interruption periods of data transmissions between a user equipment and a mobile communication network.

Furthermore, the present invention relates to a system and a mobile communication network for enhancing continuity of data transmissions and/or for reducing interruption or interruption periods of data transmissions between a user equipment and a mobile communication network.

Additionally, the present invention relates to a user equipment for enhancing continuity of data transmissions and/or for reducing interruption or interruption periods of data transmissions between the user equipment and a mobile communication network.

Furthermore, the present invention relates to a program comprising a computer readable program code, and to a computer-readable medium comprising instructions which when executed facilitate performance of a method according to the invention.

BACKGROUND

Presently, a number of use cases or applications within mobile communication networks do not necessarily require the complete functionality of, e.g., modern user equipments such as smartphones or other personal assistant devices. Hence, for certain device categories, an extremely stripped-down functionality level is applied for certain devices such as narrowband internet-of-things devices or other machine type communication devices—typically in order to reduce energy consumption of such devices, typically powered by batteries, and, as a result, to enhance battery life. One aspect of such an intentionally reduced functionality level relates to the lack of certain mobility-related functions or procedures of such specific categories of user equipments, such as, e.g. a lack of availability of handover procedures and/or mechanisms while such user equipments are connected to the mobile communication network, i.e. typically towards a specific (serving) base station entity of the (access network of the) mobile communication network.

For conventionally known user equipments, such an intentional limitation of features or functionalities typically means that—in case that mobility happens, leading to a deterioration of the radio link towards the serving base station entity, while the user equipment is in connected mode or while a transmission is occurring between the user equipment and the respective base station entity—a radio link failure procedure is used to resume the connection and/or transmission with another base station entity.

The drawback of such a situation is that, typically, the interruption of the data transmission, due to invoking, by the user equipment, the radio link failure procedure, is comparably large, leading, inter alia, to an increased power consumption of the user equipment and/or to an increased latency in the transmission of data from the user equipment to the mobile communication network.

SUMMARY

In an exemplary embodiment, the present invention provides a method for enhancing continuity of data transmissions and/or for reducing interruption or interruption periods of data transmissions between a user equipment and a mobile communication network. The mobile communication network comprises or is assigned to a radio access network. The radio access network comprises at least a first base station entity and a second base station entity. The method comprises: receiving, by the user equipment, a radio link threshold indication, the radio link threshold indication being related to at least one radio link quality parameter and indicating a threshold value regarding the at least one radio link quality parameter; measuring or detecting, by the user equipment while being in connected mode and being served by the first base station entity, a deterioration of a radio communication link to and/or from the first base station entity; and based on comparing the measured or detected deterioration to the threshold value of the radio link threshold indication, initiating, by the user equipment, a preparation stage for a radio link failure procedure, wherein a possible outcome of the radio link failure procedure is the user equipment being served by the second base station entity instead of the first base station entity.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
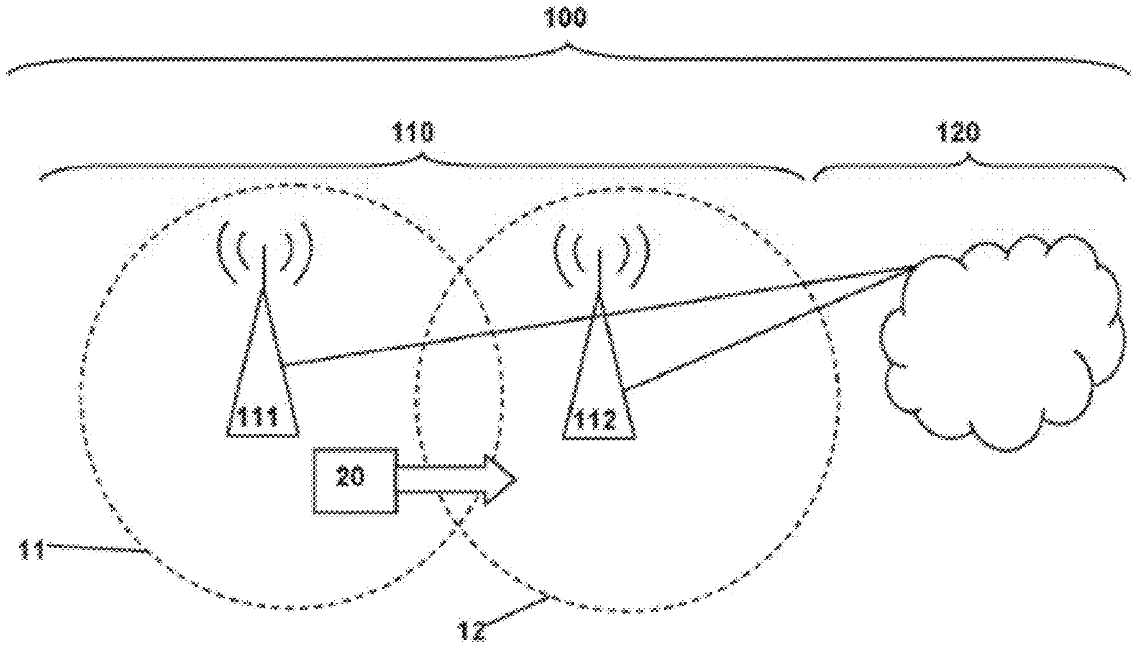
FIG. 1 schematically illustrates an embodiment of a system and/or mobile communication network according to the present invention comprising a user equipment and a plurality of base station entities.

Exemplary embodiments of the present invention provide a method, a system, a telecommunications network, and a user equipment for enhancing continuity of data transmissions and/or for reducing interruption or interruption periods of data transmissions between a user equipment and a mobile communication network. Additionally, exemplary embodiments of the present invention provide a program comprising a computer readable program code, and a computer-readable medium comprising instructions which when executed facilitate performance of a method according to the invention.

In an exemplary embodiment, the present invention provides a method for enhancing continuity of data transmissions and/or for reducing interruption or interruption periods of data transmissions between a user equipment and a mobile communication network, the mobile communication network comprising or being assigned to a radio access network, the radio access network comprising at least a first base station entity and a second base station entity, each one of the base station entities potentially serving the user equipment, wherein—upon the user equipment, while being in connected mode and being served by the first base station entity, measuring or detecting a deterioration of the radio communication link to and/or from the first base station entity—the user equipment initiates a radio link failure procedure in case of a sufficiently strong deterioration of the radio communication link to and/or from the first base station entity, possibly leading to the user equipment eventually being served by the second base station entity instead of the first base station entity, wherein the method comprises the following steps:

- in a first step, the user equipment receives a radio link threshold indication, the radio link threshold indication being related to at least one radio link quality parameter and indicates a threshold value regarding the at least one radio link quality parameter,
- in a second step, subsequent to the first step, the user equipment initiates—in order to enhance continuity of an occurring data transmission and/or for reducing interruption or interruption periods of an occurring data transmission with the first base station entity—a preparation stage for the radio link failure procedure in case that a measurement or a determination regarding the at least one radio link quality parameter indicates a worse radio communication link quality compared to the threshold value of the radio link threshold indication.

According to the present invention, it is advantageously possible to enhance the continuity of data transmissions and/or to reduce the interruption or the interruption periods of data transmissions between a user equipment on the one hand, and a mobile communication network on the other hand, i.e. typically a base station entity of the mobile communication network (hereinafter normally called first base station entity). Thereby, it is advantageously possible to enhance not only the continuity of data transmissions and/or to reduce the interruption or the interruption periods thereof but also to reduce battery drainage or power consumption of the user equipment concerned as well as overhead communication and associated network load linked to eventually unsuccessful attempts to establish a radio communication link to another base station entity of the mobile communication network (hereinafter typically called second base station entity).

Especially according to the present invention, it is advantageously possible that—prior to actually being required, due to severe deterioration or complete radio link failure, to initiate or trigger the radio link failure procedure—a preparation stage for or in view of the radio link failure procedure is able to be initiated by the user equipment, and this not in a completely autonomous manner and dissociated from the mobile communication network but by using guidance obtained from the mobile communication network (typically transmitted by a base station entity, and/or received from the respective radio resources entity or entity responsible for mobility management).

Hence, the present invention relates to the situation that the user equipment, while being in connected mode and being served by a base station entity, measures or detects a deterioration of the radio communication link to and/or from the first base station entity, wherein a radio link failure procedure is initiated in case of a sufficiently strong deterioration of the radio communication link to and/or from the first base station entity—especially in case of the user equipment moving geographically within the radio coverage area of or associated with the respective serving base station entity, i.e. in a mobility-related deterioration of the radio communication link. In such a situation, in order for the user equipment being able to continue to communicate with the mobile communication network, a further base station entity (i.e. especially a second base station entity) needs to be found.

According to the present invention, in a first step, the user equipment receives a radio link threshold indication from the mobile communication network, i.e. typically from the serving base station entity (or the first base station entity). The radio link threshold indication is related to at least one radio link quality parameter and indicates a threshold value regarding the at least one radio link quality parameter. In a second step, subsequent to the first step, the user equipment initiates—in order to enhance continuity of an occurring data transmission and/or for reducing interruption or interruption periods of an occurring data transmission with the first base station entity—a preparation stage for the radio link failure procedure in case that a measurement or a determination regarding the at least one radio link quality parameter indicates a worse radio communication link quality compared to the threshold value of the radio link threshold indication.

In recent years, narrow band internet-of-things technology (NB-IoT technology) has been developed by 3GPP to provide an efficient, power optimized and cost reduced radio system for the support of simple internet-of-things applications, such as sensors. The characteristics of the NB-IoT system are driven from extremely stripped-down functionality compared to regular cellular systems like UMTS or LTE. The simplification principle also touched the classical mobility management in cellular networks which is normally based on the procedure of "cell reselection" while the user equipment is in idle mode, or network controlled handover while the user equipment is in connected mode. According to narrow band internet-of-things technology, only cell selection is applied for idle user equipments as mobility events or mobile user equipments conventionally happened comparatively rarely and in connected mode the "Radio Link Failure" procedure is used, which is basically based on a loss of (the radio connection towards) the serving cell and a Radio Link Reestablishment towards a target cell. As typically the time of a narrow band internet-of-things technology device spending in connected mode is quite limited (due, typically, to the small amount of data to be transferred) and, typically, cell changes during this time interval are quite limited, this approach does not provide large drawbacks but enables a very simple system design.

Recently however, new requirements for narrow band internet-of-things technology emerged which result in the situation where cell changes during connected mode are happening more often than according to the initial narrow band internet-of-things technology design considered. The issue with radio link failure-based mobility approach—while simple on the network and device side; as no handover needs to be performed—results in more frequent interruption times while changing the cell with the radio link failure procedure. As the user equipment will stay connected at the old radio cell (i.e. the first base station entity) as long as it is acceptably good, the user equipment starts searching for a new target cell (i.e. the second base station entity) only once the radio link failure occurred on the current serving cell. No measurement reporting from the user equipment to the network and handover instruction is applied.

In order to overcome the mentioned drawback, an indication (i.e. the radio link threshold indication) is added to the user equipment to speed up the cell selection process after the radio link failure event. Likewise, it is advantageously possible and preferred according to the present invention to use the radio link threshold indication for a cell selection procedure (or for a preparation stage for the cell selection procedure) of the user equipment (while in idle mode) upon the user equipment measuring or detecting a deterioration of the radio communication link (or of the radio signals received from the first base station entity) beyond the level indicated by the radio link threshold indication, or to initiate a cell selection procedure in case that a sufficiently strong deterioration of the radio communication link (or of the radio signals received from the first base station entity) is determined or measured by the user equipment (comparable to a level that would otherwise, in connected mode of the user equipment, would have resulted in the initiation of the radio link failure procedure).

According to the present invention, it is preferred that, prior to the second step, especially prior to, during or after the first step, the user equipment receives a radio cell list indication, the radio cell list indication being related to a set or a list of radio cells or base station entities—potential target cells—that might potentially serve the user equipment, especially after the radio communication link between the user equipment and the first base station entity is interrupted, wherein—during the second step and either as part of the preparation stage for the radio link failure procedure, or as part of the radio link failure procedure—the radio cell list indication is used for prioritized measurements and the potential establishment of a radio communication link after a radio link failure with the first base station entity.

Hence, according this preferred embodiment of the present invention, the signaling from the mobile communication network towards the user equipment is defined as follows: (1) The user equipment is predefined with a threshold of the serving cell quality (i.e. the radio link threshold indication; e.g. if the serving cell quality is fallen under that threshold, the user equipment starts preparing the radio link failure event). (2) The user equipment is additionally provided with a list of candidate radio cells the user equipment should consider to select if the radio link failure on the current serving cell (i.e. the first base station entity) really happens.

It is thereby advantageously possible according to the present invention that the user equipment already knows—during the radio link failure process—which cell or which plurality of cells would be enabled as potential target cell(s) for selection. Based on the in advance-knowledge and the potentially already performed cell identification, the entire radio link failure process as well as the radio link failure recovery process is shortened, resulting in a minimized data-transmission interruption.

It is furthermore preferred according to the present invention that the radio cell list indication additionally indicates or is related to a set or a list of radio cells or base station entities—potential target cells—that might potentially serve the user equipment after the radio communication link between the user equipment and a neighbor radio cell of the first base station entity is interrupted.

It is thereby advantageously possible for the user equipment to establish a radio connection with the mobile communication network (but typically via a different base station entity compared to the first base station entity, such as the second base station entity) more quickly, and, hence, to reduce interruption or interruption periods of the data transmission.

According to a further embodiment of the present invention, in view of the potential establishment of a radio communication link with the second base station entity, especially due to mobility of the user equipment, prioritized measurements are performed during the preparation stage for the radio link failure procedure and/or at a point in time where actual radio link failure with the first base station entity has not yet occurred, wherein especially the user equipment initiates and/or performs cell search and/or cell identification procedures during the preparation stage for the radio link failure procedure and/or at a point in time where actual radio link failure with the first base station entity has not yet occurred, wherein especially during the preparation stage for the radio link failure procedure and/or prior to the user equipment actually initiating a radio link failure procedure, the user equipment performs cell identification of at least one radio cell or base station entity, especially the second base station entity, that might potentially serve the user equipment, especially after the radio communication link between the user equipment and the first base station entity is interrupted.

Thereby, it is advantageously possible to provide a quicker re-connection of the user equipment with the mobile communication network. This is especially realized via already starting the procedures to search radio cells and/or to identify radio cells at a point in time when the radio link towards the first base station entity is still available and active (i.e. its quality might be deteriorated, however, the quality of the radio link is not yet as poor as to start a radio link failure procedure). It is particularly preferred according to the present invention that the user equipment performs cell identification of a base station entity that could serve the user equipment after the radio communication link between the user equipment and the first base station entity is interrupted.

According to a further embodiment of the present invention, in a third step, subsequent to the second step, the user equipment initiates a radio link failure procedure in case of a sufficiently strong deterioration of the radio communication link to and/or from the first base station entity, especially leading to an interruption of a data transmission or to an interruption period regarding a data transmission between the user equipment and the mobile communication network upon the user equipment traveling outside of the radio coverage area of the first base station entity.

Via (in the first step) the preparatory stage for the radio link failure procedure, it is advantageously possible that—while an interruption of the current data transmission (leading to an interruption period regarding this data transmission of the user equipment (i.e. between the user equipment and the mobile communication network) upon the user equipment traveling outside of the radio coverage area of the first base station entity) is almost unavoidable—to provide for preparations (i.e. the preparatory stage) regarding the radio link failure procedure such that the mentioned data transmission interruption is a short as possible— and this without the need to provide the user equipment with conventionally known handover functionality that would lead in dramatically increasing the complexity (and, hence, costs as well as, typically, additional power consumption) of the user equipment. Typically, a handover procedure involves indicating the target radio cell (e.g. the second base station entity) to the user equipment. This is normally based on measurements having been performed, by the user equipment, prior to the handover event or procedure, and—in an attempt to minimize interruptions of data transmissions of the user equipment—the mobile communication network strives to prepare the target radio cell to serve the user equipment (subsequently to the user equipment being served by the first base station entity). However, according to the present invention, comparatively short interruptions of data traffic between the user equipment and the mobile communication network are not as important (or critical)—especially compared to, e.g., other kinds of low-latency data transmissions, such as, e.g., voice transmissions —, that adding the required complexity for handover functionality would be warranted.

According to the present invention, it is furthermore preferred that the radio link threshold indication is related to at least one out of the following radio link quality indicators:

the number of re-transmissions or an indication that the number of re-transmissions is increased or is currently increasing, the number of out-of-sync events or an indication that the number of out-of-sync events is increased or is currently increasing, the value of the reference signal received power (RSRP), the value of the received signal strength indicator (RSSI), the value of the reference signal received quality (RSRQ), the value of the signal to interference plus noise ratio (SINR), wherein especially the radio link threshold indication specifies—regarding one or a plurality of radio link quality indicators, respectively—a threshold value:

wherein either the threshold value corresponds to a quality level of the radio link between the user equipment and the first base station entity, wherein the quality level is in between the best conceivable quality on the one hand, and a quality level that would trigger radio link failure procedure on the other hand, and/or wherein the threshold value corresponds to a deterioration trend threshold value, the deterioration trend threshold value corresponding to a quality decrease per time interval of the radio link between the user equipment and the first base station entity, while the quality level of this radio link nevertheless being above, or better than, the quality level that would trigger radio link failure procedure.

Thereby, it is advantageously possible that the radio link threshold indication relates to a meaningful radio link quality indicator or to a meaningful combination of a plurality of different radio link quality indicators.

According to a further preferred embodiment of the present invention, at least one piece of information out of the radio link threshold indication and the radio cell list indication is broadcast by the first base station entity such that this piece of information is potentially received and applied by a plurality of different user equipments, or transmitted, by the first base station entity, to the user equipment in a dedicated manner, wherein especially a further user equipment receives, likewise transmitted by the first base station entity, the radio link threshold indication and/or the radio cell list indication also in a dedicated manner but referring to different respective values or a different content of the radio link threshold indication and/or the radio cell list indication, wherein especially the radio link threshold indication and/or the radio cell list indication is dynamically updated, especially in dependency of the geographical location of the user equipment and/or of other triggers, especially load balancing.

Thereby, it is advantageously possible—via applying a broadcast approach—to apply the radio link threshold indication (i.e. the same values regarding the potentially different radio link quality indicators) and/or the radio cell list indication for all user equipment within a considered radio cell. Alternatively, via applying a dedicated transmission approach, it is advantageously possible to selectively indicate thresholds and target cells to different user equipments to allow individual mobility management decisions.

According to still a further preferred embodiment of the present invention, the prioritized measurements are performed exclusively related to the radio cells or base station entities referred to by the radio cell list indication, especially during the preparation stage for the radio link failure procedure and/or at a point in time where actual radio link failure with the first base station entity has not yet occurred, wherein especially, the radio cell list indication is related to a comparatively low number of radio cells, typically in the vicinity of the first base station entity, wherein especially the radio cell list indication is related to only one radio cell or two radio cells or three radio cells.

Thereby, it is advantageously possible according to the present invention that preparatory measurements (in view of a potential radio link failure) are able to be reduced or limited to such radio cells or base station entities referred to by the radio cell list indication, thereby reducing the required power spent on such measurements. Especially, it is preferred that only a comparatively low number of potential target base station entities or radio cells are referred to by the radio cell list indication.

According to the present invention, it is furthermore preferred that the user equipment is a user equipment unable to perform a handover procedure, the user equipment especially being intentionally unable to perform a handover procedure due to its device category, wherein the user equipment especially is machine type communication device and/or a narrow band internet-of-things device.

Thereby, it is advantageously possible to provide enhanced mobility support for such categories of user equipments.

The present invention also relates to a system for enhancing continuity of data transmissions and/or for reducing interruption or interruption periods of data transmissions between a user equipment and a mobile communication network, the system comprising the mobile communication network and the user equipment, the mobile communication network comprising or being assigned to a radio access network, the radio access network comprising at least a first base station entity and a second base station entity, each one of the base station entities potentially serving the user equipment, wherein—upon the user equipment, while being in connected mode and being served by the first base station entity, measuring or detecting a deterioration of the radio communication link to and/or from the first base station entity—the user equipment initiates a radio link failure procedure in case of a sufficiently strong deterioration of the radio communication link to and/or from the first base station entity, possibly leading to the user equipment eventually being served by the second base station entity instead of the first base station entity, wherein the system is configured such that:

the user equipment receives a radio link threshold indication, the radio link threshold indication being related to at least one radio link parameter and indicates a threshold value regarding the at least one radio link parameter, the user equipment initiates—in order to enhance continuity of an occurring data transmission and/or for reducing interruption or interruption periods of an occurring data transmission with the first base station entity—a preparation stage for the radio link failure procedure in case that a measurement or a determination regarding the at least one radio link parameter indicates a worse radio communication link quality compared to the threshold value of the radio link threshold indication.

The present invention further relates to a mobile communication network for enhancing continuity of data transmissions and/or for reducing interruption or interruption periods of data transmissions between a user equipment and a mobile communication network, the mobile communication network comprising or being assigned to a radio access network, the radio access network comprising at least a first base station entity and a second base station entity, each one of the base station entities potentially serving the user equipment, wherein—upon the user equipment, while being in connected mode and being served by the first base station entity, measuring or detecting a deterioration of the radio communication link to and/or from the first base station entity—the user equipment initiates a radio link failure procedure in case of a sufficiently strong deterioration of the radio communication link to and/or from the first base station entity, possibly leading to the user equipment eventually being served by the second base station entity instead of the first base station entity, wherein the mobile communication network is configured such that:

the mobile communication network transmits a radio link threshold indication to the user equipment, the radio link threshold indication being related to at least one radio link parameter and indicates a threshold value regarding the at least one radio link parameter, the user equipment initiates—in order to enhance continuity of an occurring data transmission and/or for reducing interruption or interruption periods of an occurring data transmission with the first base station entity—a preparation stage for the radio link failure procedure in case that a measurement or a determination regarding the at least one radio link parameter indicates a worse radio communication link quality compared to the threshold value of the radio link threshold indication.

Via such a system and mobile communication network, it is advantageously possible to enhance the continuity of data transmissions and/or to reduce the interruption or the interruption periods of data transmissions between a user equipment on the one hand, and a mobile communication network on the other hand, i.e. typically a base station entity of the mobile communication network (hereinafter normally called first base station entity). Thereby, it is advantageously possible to enhance not only the continuity of data transmissions and/or to reduce the interruption or the interruption periods thereof but also to reduce battery drainage or power consumption of the user equipment concerned as well as overhead communication and associated network load linked to eventually unsuccessful attempts to establish a radio communication link to another base station entity of the mobile communication network (hereinafter typically called second base station entity).

Additionally, the present invention relates to a user equipment for enhancing continuity of data transmissions and/or for reducing interruption or interruption periods of data transmissions between the user equipment and a mobile communication network, the mobile communication network comprising or being assigned to a radio access network, the radio access network comprising at least a first base station entity and a second base station entity, each one of the base station entities potentially serving the user equipment, wherein—upon the user equipment, while being in connected mode and being served by the first base station entity, measuring or detecting a deterioration of the radio communication link to and/or from the first base station entity—the user equipment initiates a radio link failure procedure in case of a sufficiently strong deterioration of the radio communication link to and/or from the first base station entity, possibly leading to the user equipment eventually being served by the second base station entity instead of the first base station entity, wherein the user equipment is configured such that:

the user equipment receives a radio link threshold indication, the radio link threshold indication being related to at least one radio link parameter and indicates a threshold value regarding the at least one radio link parameter, the user equipment initiates—in order to enhance continuity of an occurring data transmission and/or for reducing interruption or interruption periods of an occurring data transmission with the first base station entity—a preparation stage for the radio link failure procedure in case that a measurement or a determination regarding the at least one radio link parameter indicates a worse radio communication link quality compared to the threshold value of the radio link threshold indication.

Via such a user equipment, it is advantageously possible to enhance the continuity of data transmissions and/or to reduce the interruption or the interruption periods of data transmissions between a user equipment on the one hand, and a mobile communication network on the other hand, i.e. typically a base station entity of the mobile communication network (hereinafter normally called first base station entity).

Furthermore, the present invention relates to a program comprising a computer readable program code which, when executed on a computer or on a network node of a mobile communication network or on a user equipment, or in part on a network node of a mobile communication network and/or in part on a user equipment, causes the computer or the network node of the mobile communication network or the user equipment to perform a method according to the present invention.

Additionally, the present invention relates to a computer-readable medium comprising instructions which when executed on a computer or on a network node of a mobile communication network or on a user equipment, or in part on a network node of a mobile communication network and/or in part on a user equipment, causes the computer or the network node of the mobile communication network or the user equipment to perform a method according to the present invention.

These and other characteristics, features and advantages of the present invention will become apparent from the following detailed description, taken in conjunction with the accompanying drawings, which illustrate, by way of example, the principles of the invention. The description is given for the sake of example only, without limiting the scope of the invention. The reference figures quoted below refer to the attached drawings.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes.

Where an indefinite or definite article is used when referring to a singular noun, e.g. "a", "an", "the", this includes a plural of that noun unless something else is specifically stated.

Furthermore, the terms first, second, third and the like in the description and in the claims are used for distinguishing between similar elements and not necessarily for describing a sequential or chronological order. It is to be understood that the terms so used are interchangeable under appropriate circumstances and that the embodiments of the invention described herein are capable of operation in other sequences than described of illustrated herein.

According to the present invention, an improved method for establishing or for facilitating to establish a voice communication session between a first user equipment 21 and a second user equipment 22 is disclosed.

In FIG. 1, an exemplary embodiment of a system and/or mobile communication network 100 according to the present invention is schematically shown. The mobile communication network 100 comprises a user equipment 20 that is connected to the mobile communication network 100. In reality, typically a plurality of user equipments 20 are present and connected (or potentially connected) to the mobile communication network 100. Typically and conventionally, the mobile communication network 100 comprises a (mobile) access network or radio access network 110 as well as a core network 120. The radio access network or (mobile) access network 110 is schematically and exemplarily shown as comprising two base station entities, schematically representing the radio access network, namely a first base station entity 111, and a second base station entity 112. The first base station entity 111 has or serves (or corresponds to) a first radio cell or radio coverage area indicated via a dashed circle and reference sign 11, whereas the second base station entity 112 has or serves (or corresponds to) a second radio cell or radio coverage area indicated via likewise a dashed circle and reference sign 12. The user equipment 20 or the plurality of user equipments (not represented in FIG. 1) use the mobile communication network 100 for communication purposes, especially communication services being provided by the mobile communication network 100, such as data transmission or the like.

According to the present invention, a method, system, mobile communication network, and/or user equipment or client entity provides for enhancing continuity of data transmissions and/or for reducing interruption or interruption periods of data transmissions between the user equipment 20 and the mobile communication network 100. The mobile communication network 100 comprises or is assigned to a radio access network 110, and the radio access network comprises at least a first base station entity 111 and a second base station entity 112, each one of the base station entities 111, 112 potentially serving the user equipment 20. According to a conventionally known radio link failure mechanism, the user equipment 20 is able to determine a deterioration of the radio communication link (via measuring or detecting at least one parameter of the radio communication link to and/or from the first base station entity 111, while being in connected mode and being served by the first base station entity 111), and the user equipment 20 initiates a radio link failure procedure in case of a sufficiently strong deterioration of the radio communication link to and/or from the first base station entity 111. This possibly leads to the user equipment 20 eventually being served by the second base station entity 112 (or another base station entity) instead of the first base station entity 111.

According to the present invention, the method comprises the following steps:

in a first step, the user equipment 20 receives a radio link threshold indication 201, the radio link threshold indication 201 being related to at least one radio link quality parameter and indicates a threshold value regarding the at least one radio link quality parameter, in a second step, subsequent to the first step, the user equipment 20 initiates—in order to enhance continuity of an occurring data transmission and/or for reducing interruption or interruption periods of an occurring data transmission with the first base station entity 111—a preparation stage for the radio link failure procedure in case that a measurement or a determination regarding the at least one radio link quality parameter indicates a worse radio communication link quality compared to the threshold value of the radio link threshold indication 201.

According to a preferred embodiment of the present invention, not only the radio link threshold indication 201 but also a radio cell list indication 202 is received, by the user equipment 20, from the first base station entity 111, the radio cell list indication 202 being related to a set or a list of radio cells or base station entities—potential target cells—that might potentially serve the user equipment 20, especially after the radio communication link between the user equipment 20 and the first base station entity 111 is interrupted.

While the present invention is primarily directed to user equipments 20 unable to perform a handover procedure (i.e. the user equipments 20 are normally intentionally unable to perform a handover procedure due to their device category), and especially to narrow band internet-of-things devices and/or machine type communication devices, the present invention is not restricted thereto, but the application of the present invention is most valuable for this particular cellular radio technology (i.e. narrow band internet-of-things devices and/or machine type communication devices); however, the present invention might also be applied to other technologies, such as LTE and NR (5G).

Figure 2:
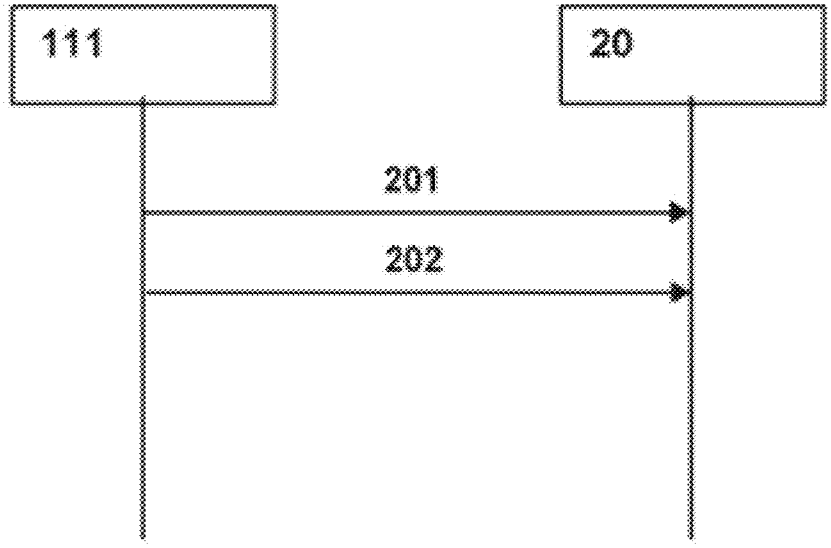
FIG. 2 schematically illustrates an exemplary communication diagram according to the present invention.

In FIG. 2, an exemplary communication diagram according to the present invention between the first base station entity 111 and the user equipment 20 is schematically shown. In this example, the first base station entity 111 provides or transmits both the radio link threshold indication 201 and the radio cell list indication 202 to the user equipment 20.

According to a preferred embodiment of the present invention, the user equipment 20, during the connected mode, receives these indications (i.e. the radio link threshold indication 201 and the radio cell list indication 202). This might—according to the present invention—either be provided using a broadcast transmission from the first base station entity 111 to the user equipment 20, or in a dedicated manner, i.e. the respective indications are specifically (or dedicatedly) provided to the user equipment 20 (and would be, generally, provided differently, i.e. with the indications relating to different values, to other user equipment). Typically, in order to specifically or dedicatedly transmit the radio link threshold indication 201 and/or the radio cell list indication 202, RRC signaling is used via the DCCH channel to provision the "RLF threshold" (radio link threshold indication 201) and the set of candidate cells (radio cell list indication 202) to be considered during (or after) the radio link failure procedure. The content of the radio link threshold indication 201 might be, e.g., a "serving cell quality radio link failure threshold" referring to one or a plurality of radio link quality parameters such as RSRP (reference signal received power), SINR (signal to interference plus noise ratio) or the like. Furthermore, as part of the radio cell list indication 202, a set of potential target (radio) cells (such as, e.g., three different radio cells or base station entities "1", "2", and "3") for "Serving cell RLF"—i.e. to indicate potential target cells in case the user equipment 20 has been previously connected to the first base station entity 111 —, and a set of potential target (radio) cells for a set of neighbor cells—i.e. to indicate potential target cells in case the user equipment 20 has been previously connected to one of the neighbor cells (e.g. neighbor cells "A", "B", and "C") of the first base station entity 111, e.g. cells "1", "2", "3", "4" as targets from neighbor cell "A", cells "1", "4", "5", "6", and "7" as targets from neighbor cell "B", and cells "4", "6", "7", "8", and "9" as targets from neighbor cell "C".

According to the present invention, it is furthermore preferred that for a mobile user equipment 20 the set of radio link quality parameters or values thereof (cf. the example provided) will be updated dynamically by the network (RAN) depending on the geographical location or other triggers (e.g. for load balancing).

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for enhancing continuity of data transmissions and/or for reducing interruption or interruption periods of data transmissions between a user equipment and a mobile communication network, the mobile communication network comprising or being assigned to a radio access network, the radio access network comprising at least a first base station entity and a second base station entity, wherein the method comprises:

receiving, by the user equipment, a radio link threshold indication, the radio link threshold indication being related to at least one radio link quality parameter and indicating a threshold value regarding the at least one radio link quality parameter;

detecting, by the user equipment while being in connected mode and being served by the first base station entity, that deterioration of a radio communication link between the user equipment and the first base station entity is trending toward a threshold level of radio link failure while a quality level of this radio communication link is still higher than a quality level that would trigger a radio link failure procedure; and based on the detected deterioration toward the threshold level of radio link failure, initiating, by the user equipment, a preparation stage for a radio link failure procedure, wherein the radio link failure procedure does not include performing a handover;

wherein the method further comprises: after receiving the radio link threshold indication and prior to initiating the preparation stage for the radio link failure procedure, receiving, by the user equipment, a radio cell list indication, wherein the radio cell list indication is related to potential target cells for serving the user equipment after the radio communication link between the user equipment and the first base station entity is interrupted;

wherein the method further comprises:

during the preparation stage for the radio link failure procedure and at a point in time where actual radio link failure with the first base station entity has not yet occurred, performing, by the user equipment, prioritized measurements using the target cells from the radio cell list indication;

detecting radio link failure of the radio communication link; and in response to the detecting radio link failure of the radio communication link, selecting, by the user equipment, a target cell from the radio cell list indication based on the prioritized measurements and sending a Radio Link Reestablishment towards the target cell.

2. The method according to claim 1, wherein the radio cell list indication is used for prioritized measurements and potential establishment of a new radio communication link after a radio link failure with the first base station entity.

3. The method according to claim 2, wherein the radio cell list indication additionally indicates or is related to potential target cells for serving the user equipment after a radio communication link between the user equipment and a neighbor radio cell of the first base station entity is interrupted.

4. The method according to claim 1, wherein, in view of a potential establishment of a radio communication link with the second base station entity due to mobility of the user equipment, prioritized measurements are performed during the preparation stage for the radio link failure procedure and/or at a point in time where actual radio link failure with the first base station entity has not yet occurred;

wherein the user equipment initiates and/or performs cell search and/or cell identification procedures during the preparation stage for the radio link failure procedure and/or at a point in time where actual radio link failure with the first base station entity has not yet occurred;

wherein during the preparation stage for the radio link failure procedure and/or prior to the user equipment actually initiating a radio link failure procedure, the user equipment performs cell identification with respect to the second base station entity.

5. The method according to claim 1, further comprising:

initiating, by the user equipment, the radio link failure procedure in case of a deterioration of the radio communication link between the user equipment and the first base station entity leading to an interruption of a data transmission or to an interruption period regarding a data transmission between the user equipment and the mobile communication network upon the user equipment traveling outside of a radio coverage area of the first base station entity.

6. The method according to claim 1, wherein the radio link threshold indication is related to at least one out of the following radio link quality indicators:

a number of re-transmissions or an indication that the number of re-transmissions is increased or is currently increasing, a number of out-of-sync events or an indication that the number of out-of-sync events is increased or is currently increasing, a value of a reference signal received power (RSRP), a value of a received signal strength indicator (RSSI), a value of a reference signal received quality (RSRQ), or a value of a signal to interference plus noise ratio (SINR).

7. The method according to claim 2, wherein:

at least one piece of information out of the radio link threshold indication or the radio cell list indication is broadcast by the first base station entity, or at least one piece of information out of the radio link threshold indication or the radio cell list indication is transmitted, by the first base station entity, to the user equipment in a dedicated manner, wherein different user equipments receive different radio link threshold indications or radio cell list indications having different respective values or different content; and wherein the radio link threshold indication and/or the radio cell list indication is dynamically updated based on a geographical location of the user equipment and/or based on load balancing.

8. The method according to claim 2, wherein the prioritized measurements are performed exclusively with respect to the potential target cells referred to by the radio cell list indication during the preparation stage for the radio link failure procedure and/or at a point in time where actual radio link failure with the first base station entity has not yet occurred; and wherein the radio cell list indication contains three or less target cells.

9. The method according to claim 1, wherein the user equipment is intentionally unable to perform a handover procedure due to its device category, and wherein the user equipment is a machine type communication device and/or a narrow band internet-of-things device.

10. A system, comprising:

a mobile communication network; and a user equipment;

wherein the mobile communication network comprises or is assigned to a radio access network, the radio access network comprising at least a first base station entity and a second base station entity;

wherein the mobile communication network is configured to transmit a radio link threshold indication to the user equipment, the radio link threshold indication being related to at least one radio link parameter and indicating a threshold value regarding the at least one radio link parameter;

wherein the user equipment is configured to:

detect, while being in connected mode and being served by the first base station entity, that deterioration of a radio communication link between the user equipment and the first base station entity is trending toward a threshold level of radio link failure while a quality level of this radio communication link is still higher than a quality level that would trigger a radio link failure procedure; and based on the detected deterioration toward the threshold level of radio link failure, initiate a preparation stage for a radio link failure procedure, wherein the radio link failure procedure does not include performing a handover;

wherein the user equipment is further configured to receive a radio cell list indication after receiving the radio link threshold indication and prior to initiating the preparation stage for the radio link failure procedure, wherein the radio cell list indication is related to potential target cells for serving the user equipment after the radio communication link between the user equipment and the first base station entity is interrupted;

wherein the user equipment is further configured to:

during the preparation stage for the radio link failure procedure and at a point in time where actual radio link failure with the first base station entity has not yet occurred, perform prioritized measurements using the target cells from the radio cell list indication;

detecting radio link failure of the radio communication link; and in response to the detecting radio link failure of the radio communication link, select a target cell from the radio cell list indication based on the prioritized measurements and send a Radio Link Reestablishment towards the target cell.

11. A user equipment for enhancing continuity of data transmissions and/or for reducing interruption or interruption periods of data transmissions between the user equipment and a mobile communication network, the mobile communication network comprising or being assigned to a radio access network, the radio access network comprising at least a first base station entity and a second base station entity, wherein the user equipment comprises:

a processor; and a non-transitory readable medium having processor-executable instructions stored thereon;

wherein the processor-executable instructions, when executed by the processor, facilitate performance of the following by the user equipment:

receiving a radio link threshold indication, the radio link threshold indication being related to at least one radio link quality parameter and indicating a threshold value regarding the at least one radio link quality parameter;

detecting, while being in connected mode and being served by the first base station entity, that deterioration of a radio communication link between the user equipment and the first base station entity is trending toward a threshold level of radio link failure while a quality level of this radio communication link is still higher than a quality level that would trigger a radio link failure procedure; and based on the detected deterioration toward the threshold level of radio link failure, initiating a preparation stage for a radio link failure procedure, wherein the radio link failure procedure does not include performing a handover;

wherein the processor-executable instructions, when executed by the processor, further facilitate performance of the following by the user equipment: after receiving the radio link threshold indication and prior to initiating the preparation stage for the radio link failure procedure, receiving a radio cell list indication, wherein the radio cell list indication is related to potential target cells for serving the user equipment after the radio communication link between the user equipment and the first base station entity is interrupted;

wherein the processor-executable instructions, when executed by the processor, further facilitate performance of the following by the user equipment:

during the preparation stage for the radio link failure procedure and at a point in time where actual radio link failure with the first base station entity has not yet occurred, performing prioritized measurements using the target cells from the radio cell list indication;

detecting radio link failure of the radio communication link; and in response to the detecting radio link failure of the radio communication link, selecting a target cell from the radio cell list indication based on the prioritized measurements and sending a Radio Link Reestablishment towards the target cell.

12. A non-transitory computer-readable medium having processor-executable instructions stored thereon, wherein the processor-executable instructions, when executed, facilitate performance of the method according to claim 1.

13. A method for enhancing continuity of data transmissions and/or for reducing interruption or interruption periods of data transmissions between a user equipment and a mobile communication network, the mobile communication network comprising or being assigned to a radio access network, the radio access network comprising at least a first base station entity and a second base station entity, wherein the method comprises:

receiving, by the user equipment, a radio link threshold indication, the radio link threshold indication being related to at least one radio link quality parameter and indicating a threshold value regarding the at least one radio link quality parameter;

detecting, by the user equipment while being in connected mode and being served by the first base station entity, that deterioration of a radio communication link between the user equipment and the first base station entity is trending toward a threshold level of radio link failure while a quality level of this radio communication link is still higher than a quality level that would trigger a radio link failure procedure;

based on the detected deterioration toward the threshold level of radio link failure, initiating, by the user equipment, a preparation stage for a radio link failure procedure, wherein the radio link failure procedure does not include performing a handover;

wherein the method further comprises: after receiving the radio link threshold indication and prior to initiating the preparation stage for the radio link failure procedure, receiving, by the user equipment, a radio cell list indication containing three or less target cells for serving the user equipment after the radio communication link between the user equipment and the first base station entity is interrupted; and wherein the method further comprises:

during the preparation stage for the radio link failure procedure and at a point in time where actual radio link failure with the first base station entity has not yet occurred, performing, by the user equipment, prioritized measurements using the target cells from the radio cell list indication;

detecting radio link failure of the radio communication link; and in response to the detecting radio link failure of the radio communication link, selecting, by the user equipment, a target cell from the radio cell list indication based on the prioritized measurements and sending a Radio Link Reestablishment towards the target cell.

* * * * *